United States Patent [19]

Manuel et al.

[11] Patent Number: 5,200,621
[45] Date of Patent: Apr. 6, 1993

[54] OFF-SURFACE INFRARED FLOW VISUALIZATION

[75] Inventors: Gregory S. Manuel, Norfolk; Kamran Daryabeigi, Virginia Beach; Clifford J. Obara, Yorktown; David W. Alderfer, Newport News, all of Va.

[73] Assignee: The United States of America as represented by the Administrator of the National Aeronautics and Space Administration, Washington, D.C.

[21] Appl. No.: 808,302

[22] Filed: Dec. 16, 1991

[51] Int. Cl.⁵ ............... G01M 19/00; G01M 9/06
[52] U.S. Cl. ................... 250/330; 250/338.5; 250/340; 244/204; 73/147
[58] Field of Search ......... 244/136, 204, 207; 73/147; 250/330, 334, 338.5, 340

[56] References Cited

U.S. PATENT DOCUMENTS

| | | | |
|---|---|---|---|
| 3,693,015 | 9/1972 | Funk, Jr. | 250/564 |
| 3,869,909 | 3/1975 | Hale et al. | 73/147 |
| 3,977,244 | 8/1976 | Stone | 73/147 |
| 4,493,211 | 1/1985 | Weinstein | 73/147 |
| 4,896,532 | 1/1990 | Schmalz | 73/147 |
| 5,105,191 | 4/1992 | Keedy | 346/968 |

FOREIGN PATENT DOCUMENTS 579681  8/1946  United Kingdom ............... 244/136

*Primary Examiner*—Constantine Hannaher
*Assistant Examiner*—Edward J. Glick
*Attorney, Agent, or Firm*—George F. Helfrich

[57] ABSTRACT

A method for visualizing off-surface flows consists of releasing a gas with infrared absorbing and emitting characteristics into a fluid flow and imaging the flow with an infrared imaging system. This method allows for visualization of off-surface fluid flow in-flight.

5 Claims, 1 Drawing Sheet

OFF-SURFACE INFRARED FLOW VISUALIZATION

ORIGIN OF THE INVENTION

The invention described herein was jointly made by employees of the United States Government and in the performance of a NASA contract and is subject to the provisions of Section 305 of the National Aeronautics and Space Act of 1958, as amended, Public Law 85-568 (72 Stat. 435; 42 USC 2457).

BACKGROUND OF THE INVENTION

1. Technical Field of the Invention

The present invention relates generally to flow visualization, and more particularly to off-surface flow visualization using infrared imaging.

2. Discussion of the Related Art

The visualization of off-surface flow fields plays an important role in the analysis of aerodynamic characteristics observed during flight and wind-tunnel testing of aircraft configurations. Visualization can help provide a more complete qualitative understanding of important off-surface flow phenomena such as vortical flow formation, location, and breakdown. Without visualization, off-surface flow-field characteristics can be very difficult to understand.

One type of off-surface flow, wingtip vorticity, occurs when the different air pressures of the upper and lower wing surfaces circulate about the wingtip area. This induced drag airflow causes the air to spiral past the wingtips and ultimately to form vortices behind the wing. In flight under high atmospheric humidity these vortices become visible, trailing downstream from near the wingtips, because of condensation of water vapor in the low-pressure vortex cores. This is an unsatisfactory method of visualizing off-surface flows because it only occurs at the wing-tips under particular atmospheric conditions.

Active techniques to view in-flight vortical flows involve introducing smoke into the flow. One current smoke flow visualization technique consists of utilizing a smoke bomb explosive device that lasts one minute. It is small in size and is mounted external to the aircraft surface. Being of an explosive nature, the smoke bomb must have electrical leads connected to it for detonation. This technique is active for a very short time period thus allowing for the visualization of only one vorticity pattern per flight and is not practical at high speeds. Additionally, the smoke bomb, because it is mounted to the outside of the aircraft, disrupts the flow phenomenon to be visualized.

Another current smoke flow visualization technique consists of a large apparatus powered by aircraft electrical current that heats kerosene to its burning point to create smoke. This apparatus must be located near the point of smoke injection, and because of its large size is impractical for many applications.

It is accordingly an object of the present invention to visualize off-surface flow phenomena.

It is another object of the present invention to visualize off-surface flow phenomena using a method which is located entirely within the aircraft.

It is another object of the present invention to visualize off-surface flow phenomena at various speeds and altitudes.

It is another object of the present invention to visualize an unlimited number of off-surface flow phenomena during a single flight.

It is yet another object of the present invention to accomplish the foregoing objects in a simple manner.

Additional objects and advantages of the present invention are apparent from the drawings and specification which follow.

SUMMARY OF THE INVENTION

According to the present invention, the foregoing and additional objects are obtained by providing a method for visualizing off-surface fluid flow in which an infrared absorbing and emitting gas is released into the off surface area to be visualized and imaging the area with an infrared imaging system. This method may be used in a wind tunnel or in flight. When used in flight, all of the components are located on board the aircraft and the gas is released from within the aircraft. One example of an infrared absorbing and emitting gas is sulfur hexafluoride. The infrared imaging system consists of an infrared imager, an image control unit, a video tape cassette recorder, and an image monitor. The infrared imager operates in the wavelength range of 8 to 12 $\mu$m.

DETAILED DESCRIPTION OF THE INVENTION

Figure 1:
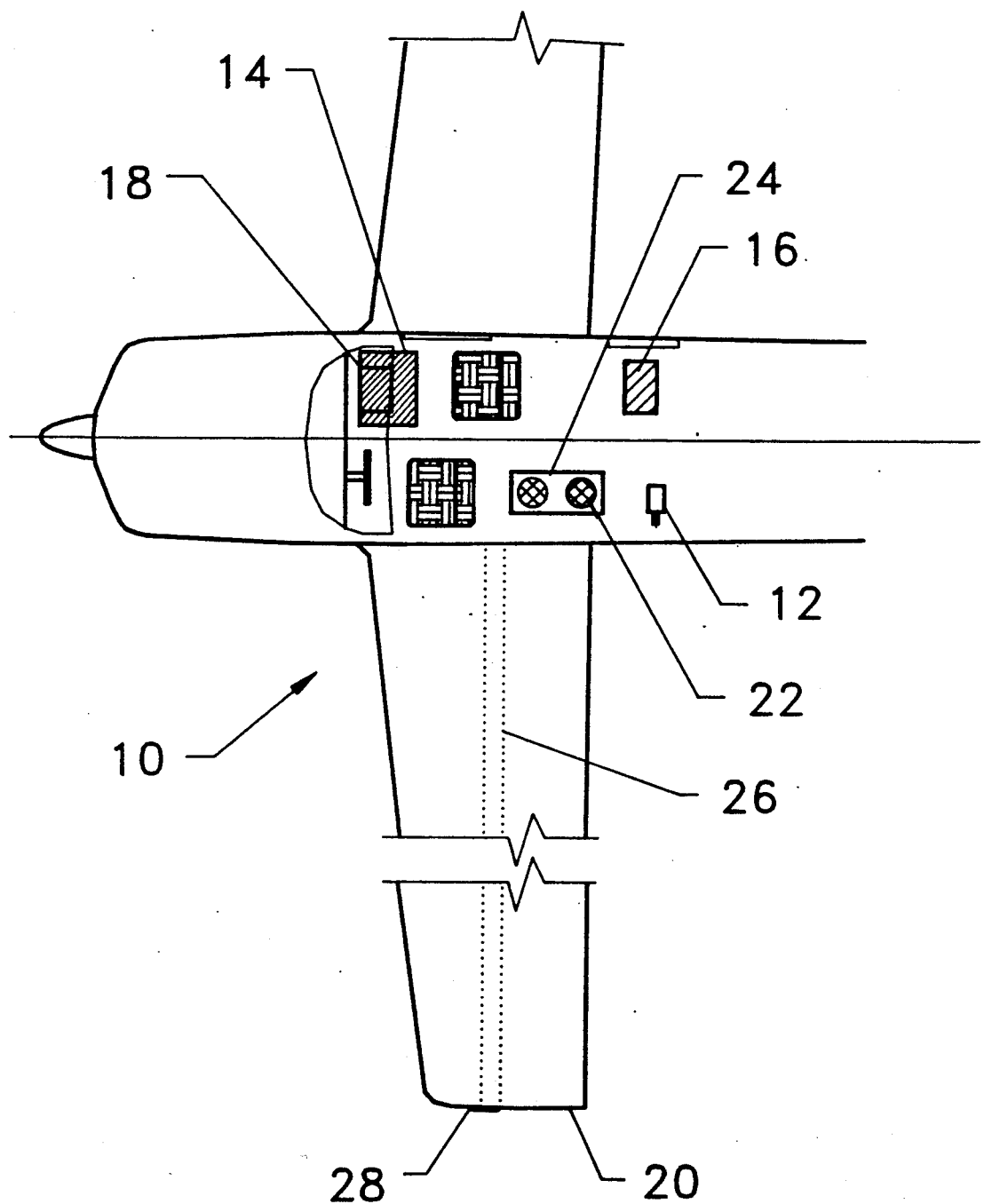
FIG. 1 is a cross-sectional view of an aircraft.

This method was tested in a single-engine, low-wing, light airplane 10 equipped with an infrared imaging system comprised of an Inframetrics 600 infrared imager 12, an image control unit 14, a video tape cassette recorder 16, and an image monitor 18. Other onboard equipment included a video camera and video tape cassette recorder, and a gas flow-seeding system. Because wingtip vorticity is a well understood aerodynamic phenomenon and its off-surface location is reference to the wingtip is well known, the wingtip vortex was selected as the off-surface phenomenon for evaluation of the infrared technique.

The Inframetrics 600 imager 12 was mounted in the rear cabin to provide a field of view downstream of the airplane's left wingtip 20. A filter was utilized to limit the spectral response of the system to 8 to 12 $\mu$m. The infrared imager 12 consisted of a single detector made of semiconductor materials. The detector was liquid nitrogen cooled to 195.5° C. for improved thermal sensitivity. The imager's lens focused the field of view on the detector, and rotating prisms and galvanometers provided the horizontal and vertical scan of the field of view across the detector. The lens used on the image scanner produced a lateral field of view of about 3.8 m at the left wingtip 20. The rear cabin window was removed because plastic does not transmit infrared radiation in the wavelength tested.

The output of the system was a monochrome video signal which was displayed in flight on the image monitor 18 and recorded on 0.5-inch VHS cassette tape.

The gas seeding system consisted of two sulfur hexafluoride ($SF_6$) gas cylinders 22 mounted to a pallet 24, two flow control valves, two flow meters, and two digital flow meter displays. For safety considerations, the pallet enclosed the gas cylinders and incorporated a vent tube to the outside of the airplane. Flow control valves controlled the gas flow from the pallet 24 and flow meters measured the gas flow rate. The outputs of the gas flow meters were shown on digital displays. The gas flow meter displays, the image control unit 14 and monitor 18 were located in front of the experimenter in the co-pilot position. The image control unit is the control unit for the imaging system. It is used to enter and send operator commands to the imager concerning, for example, the type of filter to be used, electrooptical zoom, desired gain and offset for the imager digitizer and pertinent parameters such as the temperature of the surroundings and the emissivity. The image control unit also receives the image data from the imager, performs necessary processing to convert image data to standard analog video output which can then be displayed on standard TV monitors and recorded on standard VCR's. Two 1.9-cm lines 26 were routed from the gas cylinder pallet 24 to flow meters and on to the two left wingtip nozzles 28 through the internal wing lines 26.

The $SF_6$ gas was contained in commercial size D cylinders 22. $SF_6$ gas was chosen because it is inexpensive and is not harmful to the environment. Any infrared absorbing and emitting gas may be used. Each cylinder 22 dispensed approximately 7.26 kg of $SF_6$ at an operating pressure of 2070 kpa. The combined output of the two cylinders 22 produced a maximum gas flow rate of 0.57 $m^3$/min. The gas flow rate decreased as the gas was dispensed. Gas output was maintained for approximately 15 minutes.

The flight tests were conducted over a speed range from 60–130 knots indicated airspeed and a pressure altitude range of 75 to 2750 meters during daylight conditions. The left wingtip vortex was seeded with the $SF_6$ to determine the optimum conditions for infrared imaging of the vortical flow. The response of the infrared imager 12 to different backgrounds was assessed. The $SF_6$ gas flow rate for the initial evaluation of different background conditions was at the maximum flow rate of approximately 0.57 $m^3$/min. Later flight tests investigated the minimum $SF_6$ flow rate to visualize the vortex. The $SF_6$ flow rate to the wingtip nozzle 28 was adjusted in flight via the flow control valve which was accessible to the experimenter in the co-pilot seat. Four backgrounds were tested-earth, water, clouds/haze, and clear sky. Of these only a clear sky provided excellent infrared images of the wingtip vortex. Unlimited visibility was not required, but rather an absence of clouds.

An evaluation of airplane attitude and velocity conditions with various gas flow rates with a clear sky background showed that the minimal $SF_6$ gas needed to visualize the vortex at an indicated airspeed of 120 knots was .11 $m^3$/min, independent of altitude. At an indicated airspeed of 80 knots, 0.06 $m^3$/min was the minimum required to visualize the vortex with the infrared imaging system.

What is claimed is:

1. A method for visualizing off-surface fluid flow on an aircraft in flight comprising
   releasing an infrared absorbing/emitting gas from within the aircraft into an area to be visualized; and
   imaging the area with an infrared imaging system.

2. The method for visualizing off-surface fluid flow of claim 1 wherein the infrared absorbing/emitting gas is sulfur hexafluoride.

3. The method for visualizing off-surface fluid flow of claim 1 wherein the infrared imaging system consists of an infrared imager, an image control unit, a video tape cassette recorder, and an image monitor.

4. The method for visialzing off-surface fluid flow of claim 3 wherein the infrared imaging system is located on board the aircraft.

5. The method for visualizing off-surface flows of claim 3 wherein the infrared imager operates in the wavelength range of 8 to 12 $\mu$m.

* * * * *